Sept. 7, 1926.

E. GAUTHIER

BEARING

Filed Oct. 8, 1923

Inventor
Ernest Gauthier
by H.O. Cattison
Att'y.

Patented Sept. 7, 1926.

1,598,815

UNITED STATES PATENT OFFICE.

ERNEST GAUTHIER, OF CHICAGO, ILLINOIS, ASSIGNOR TO WESTERN ELECTRIC COMPANY, INCORPORATED, OF NEW YORK, N. Y., A CORPORATION OF NEW YORK.

BEARING.

Application filed October 8, 1923. Serial No. 667,113.

The present invention relates to bearings, and more particularly to a bearing which will permit of a relative movement of its parts to compensate for the wear of such parts.

Where a bearing and the housing therefor are both divided on a plane substantially at right angles to the direction of maximum thrust, most of the wear occurs in the central portion of each semicircular division, and it is a simple operation to adjust the bearing when it becomes worn by tightening the means which serve to secure together the parts of the housing and thereby drawing together the bearing parts. However, it is not always practicable to divide a housing member at right angles to the maximum thrust of the supported member, and in cases where the bearing and the housing therefor are both divided on a plane substantially parallel to the direction of maximum thrust of the supported member, most of the wear occurs at the point of division of the bearing. This is true in punch press construction where the direction of the maximum thrust of the pitman is substantially parallel to the plane of division between the bearing and its housing. The compensation for this wear is difficult.

An object of the present invention is to provide for the adjustment of a bearing where the angle between the plane of division of the bearing housing and the direction of maximum wear on the bearing is substantially at right angles.

In order to attain this object, an apparatus made in accordance with the invention may comprise a hexagonally recessed housing member divided on a plane parallel to the thrust of the member it is designed to support, a bearing of hexagonal section divided on a plane at right angles to the plane of division of the housing, and means to cause a relative movement between the parts of the housing to adjust the bearing.

Figure 1:
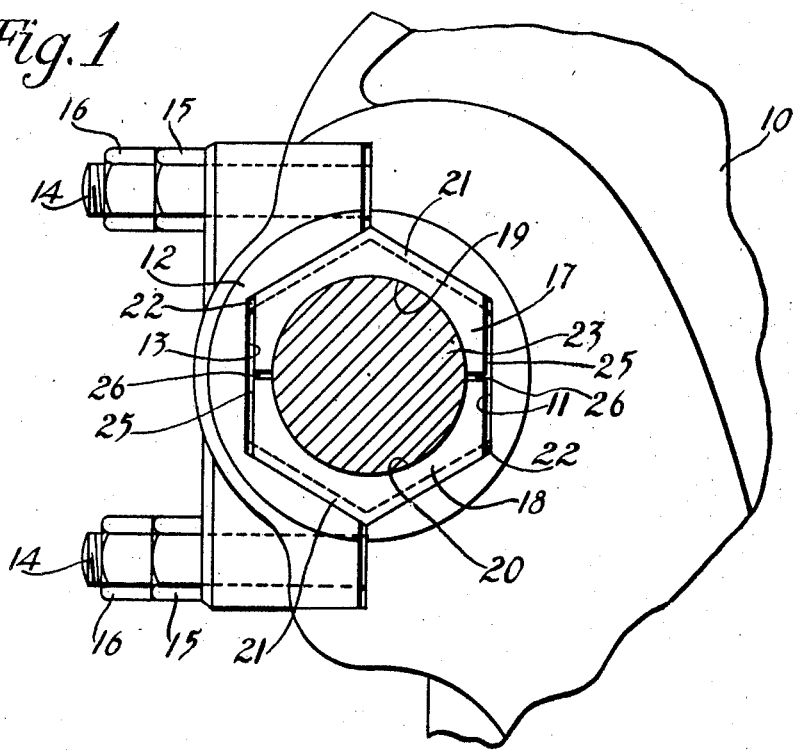
Figure 2:
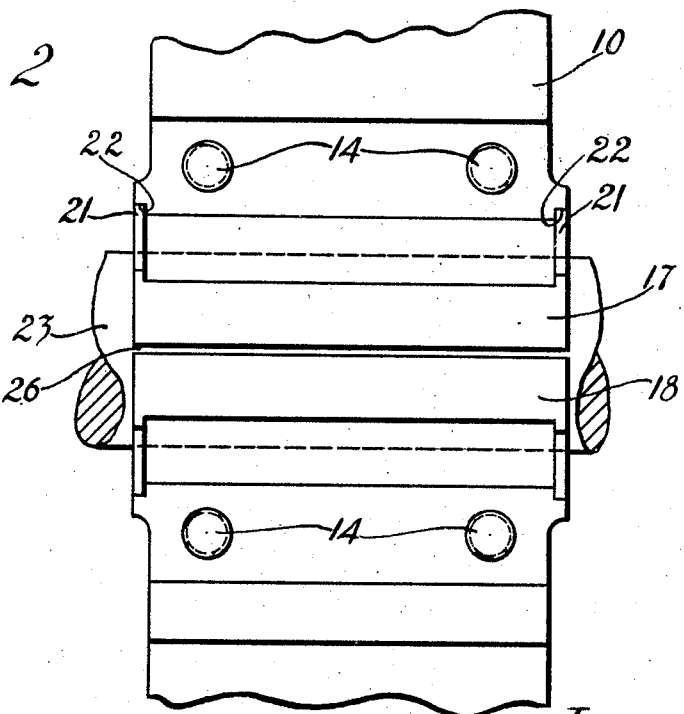

These and other features of the invention not specifically mentioned will appear from the following description and the accompanying drawings, in which Fig. 1 is a view in end elevation, and Fig. 2 is a view in front elevation, with the housing plate removed, of a bearing made in accordance with the invention.

Referring to the drawings in detail, a member 10, which may be the frame of a punch press, has a polygonal recess 11 therein, over which is secured a cap member 12 provided with a similar recess 13. Upon assembly of the members 10 and 12 a complete hexagonal recess is formed between the two members. The cap 12 may be affixed in place by studs 14, and nuts 15, and lock-nuts 16, by which the position of the cap may be adjusted as desired. Bearing members 17 and 18 forming a divided bearing are provided with exteriorly shaped surfaces to fit the hexagonal recess formed between the members 10 and 12 and are each formed with recesses 19 and 20 respectively. Members 17 and 18 are provided on either end with flanges 21, which fit in depressions 22 provided in the members 10 and 12 to prevent the lateral movement of the parts of the bearing while in use.

The interior of the bearing is carefully fitted to a shaft 23, which it is intended to support, and this fitting may be accomplished by any of the customary methods desired. As illustrated in the accompanying drawings, a clearance indicated at 25 is left between the members 10 and 12 forming the housing and the members 17 and 18 forming the bearing opposite the sides where the bearing is divided to allow the parts of the housing a relative lateral movement toward each other. A clearance indicated at 26 is also left between the members 17 and 18 to allow for a movement together of the bearing members 17 and 18 when wear thereon is to be taken up.

When a bearing of this type becomes worn, or out of adjustment, and it is desired to draw the parts thereof closer to each other, or to loosen them, the lock-nuts 16 are loosened, the nuts 15 turned to give the required seating, the lock-nuts again screwed down into place. The action of the housing on the bearing is that of a wedge, the advance of the cap or cover member 12 forcing the halves 17 and 18 of the bearing into closer proximity to each other.

The advantage of a bearing of this type will be readily understood, since it permits the adjustment of worn bearings which are divided on a plane parallel to their thrust. Furthermore, a bearing divided vertically requires more oil to properly lubricate it, since the oil is free to seep out through the split in the bottom of the bearing.

What is claimed is:

1. A bearing comprising a supporting means divided into parts, one of which is provided with a surface at an angle to the plane of division thereof, a second member divided into parts at an angle to the plane of division of the supporting member and recessed to contact with the angularly disposed surface thereof and having a lateral clearance from the supporting member, and means to cause a relative movement of the parts of the recessed member to relatively move the parts of the supporting member at an angle to the direction of movement of the parts of the recessed member.

2. A bearing comprising a bearing member having a polygonal exterior divided into parts, a housing member divided into parts at an angle to the plane of division of the bearing member and recessed to contact with a surface of the bearing member which is at an angle to the plane of division, said housing member having a clearance from the bearing member opposite the point of division of the bearing member, and means for causing a relative movement of the parts of the housing member to relatively move the parts of the bearing member at an angle to the direction of movement of the parts of the housing member and into the clearance space between the members.

3. A bearing comprising a bearing member having a polygonal exterior divided into parts, a housing member divided into parts at an angle to the plane of division of the bearing member and recessed to contact with a surface of the bearing member which is at an angle to the plane of division, said bearing member having a clearance between the parts thereof at right angles to the plane of division of the housing member, and means for causing a relative movement of the parts of the housing to relatively move the parts of the bearing toward each other at an angle to the direction of movement of the parts of the housing member.

4. A bearing comprising a bearing member having a polygonal exterior divided into parts, a housing member divided into parts at an angle to the plane of division of the bearing member and recessed to contact with a surface of the bearing member which is at an angle to the plane of division, said bearing member having a clearance between the parts thereof at right angles to the plane of division of the housing member and also a clearance from the housing member opposite the point of division of the bearing member, and means for causing a relative movement of the parts of the housing to relatively move the parts of the bearing toward each other at an angle to the direction of movement of the parts of the housing member and into the clearance space between the members.

In witness whereof, I hereunto subscribe my name this 21st day of September A. D., 1923.

ERNEST GAUTHIER.